United States Patent
Lu et al.

(10) Patent No.: US 10,234,355 B2
(45) Date of Patent: Mar. 19, 2019

(54) LEAKAGE OIL DETECTION SYSTEM

(71) Applicant: Hitachi, Ltd., Chiyoda-ku, Tokyo (JP)

(72) Inventors: Li Lu, Tokyo (JP); Satoshi Ichimura, Tokyo (JP); Tomohiro Moriyama, Tokyo (JP); Jun Nukaga, Tokyo (JP); Akira Yamagishi, Tokyo (JP); Yasutomo Saito, Tokyo (JP)

(73) Assignee: Hitachi, Ltd., Tokyo (JP)

(*) Notice: Subject to any disclaimer, the term of this patent is extended or adjusted under 35 U.S.C. 154(b) by 191 days.

(21) Appl. No.: 15/205,504

(22) Filed: Jul. 8, 2016

(65) Prior Publication Data
US 2017/0016796 A1    Jan. 19, 2017

(30) Foreign Application Priority Data

Jul. 15, 2015 (JP) .................... 2015-141465

(51) Int. Cl.
*G06K 9/00* (2006.01)
*G01M 3/20* (2006.01)
*G01M 3/38* (2006.01)
*G06T 7/00* (2017.01)

(52) U.S. Cl.
CPC ............... *G01M 3/20* (2013.01); *G01M 3/38* (2013.01); *G06T 7/0004* (2013.01)

(58) Field of Classification Search
CPC .......... G01M 3/20; G01M 3/38; G06T 7/0004
See application file for complete search history.

(56) References Cited

U.S. PATENT DOCUMENTS

| 4,364,650 A | * | 12/1982 | Terashita | ............... G03B 7/091 250/214 P |
| 4,978,990 A | * | 12/1990 | Yamasaki | ............... G03B 7/097 348/365 |
| 5,473,374 A | * | 12/1995 | Shimizu | ............. H04N 5/23248 348/229.1 |

(Continued)

FOREIGN PATENT DOCUMENTS

| JP | 5-107145 A | 4/1993 |
| JP | 8-128916 A | 5/1996 |

(Continued)

OTHER PUBLICATIONS

Japanese-language Office Action issued in counterpart Japanese Application No. 2015-141465 dated Nov. 27, 2018 with unverified English translation (seven pages).

*Primary Examiner* — Aaron W Carter
(74) *Attorney, Agent, or Firm* — Crowell & Moring LLP

(57) ABSTRACT

A leakage oil detection system includes a measurement device including a light source that causes a measured object which includes a leakage oil attachment part to be irradiated with ultraviolet rays, and an imaging device that detects fluorescence emitted from the leakage oil attachment part which is irradiated with the ultraviolet rays, and performs imaging on the measured object; and an analysis device that includes a driving control unit that controls operations of the light source and the imaging device, a recording unit that records an imaged image of the measured object which is imaged by the imaging device, and an image processing unit that calls the imaged image which is recorded in the recording unit and performs an image process to detect leakage oil.

8 Claims, 6 Drawing Sheets

(56) References Cited

U.S. PATENT DOCUMENTS

| | | | | |
|---|---|---|---|---|
| 5,974,860 | A  * | 11/1999 | Kuroda | G01M 3/38 |
| | | | | 250/301 |
| 9,898,830 | B2 * | 2/2018 | Lu | G01V 8/00 |
| 2003/0197795 | A1 * | 10/2003 | Schinner | H04N 5/243 |
| | | | | 348/255 |
| 2005/0170332 | A1 | 8/2005 | Shimamoto | |
| 2009/0040338 | A1 * | 2/2009 | Muramatsu | G03B 7/28 |
| | | | | 348/229.1 |
| 2009/0056949 | A1 | 3/2009 | McStay et al. | |
| 2013/0083237 | A1 * | 4/2013 | Satou | H04N 5/2351 |
| | | | | 348/362 |
| 2015/0373246 | A1 * | 12/2015 | Arakawa | H04N 5/2356 |
| | | | | 348/234 |
| 2016/0080625 | A1 * | 3/2016 | Itoh | G06K 9/00771 |
| | | | | 348/234 |
| 2016/0266347 | A1 * | 9/2016 | Shimoda | G02B 7/32 |
| 2016/0275699 | A1 * | 9/2016 | Lu | G06T 7/408 |
| 2017/0016796 | A1 * | 1/2017 | Lu | G06T 7/0004 |
| 2017/0234762 | A1 * | 8/2017 | Lu | G01M 3/38 |
| | | | | 250/459.1 |

FOREIGN PATENT DOCUMENTS

| | | |
|---|---|---|
| JP | 9-304281 A | 11/1997 |
| JP | 11-196291 A | 7/1999 |
| JP | 2005-214924 A | 8/2005 |
| JP | 2007-101228 A | 4/2007 |
| JP | 2008-116389 A | 5/2008 |
| JP | 2011-117857 A | 6/2011 |

* cited by examiner

LEAKAGE OIL DETECTION SYSTEM

CLAIM OF PRIORITY

The present application claims priority from Japanese Patent application serial No. 2015-141465, filed on Jul. 15, 2015, the content of which is hereby incorporated by reference into this application.

BACKGROUND OF THE INVENTION

Field of the Invention

The present invention relates to a leakage oil detection system, and, in particular, to a leakage oil detection system which is suitable to detect leakage oil in an oil-filled apparatus such as a transformer, a condenser, a hydraulic operator of a Gas Insulated Switch (GIS), and a rectifier.

Background Art

In an oil storage tank, a transformer, or the like, there has been concern for the occurrence of oil leakage (leakage oil) due to degradation, accidents, or the like in the past. Since there is a possibility that leakage oil leads to environmental pollution and disasters, a simple and highly-accurate detection technology is required at an early stage of the leakage oil.

A technology disclosed in JP-A-2008-116389 is provided as a related art for solving the above problem. JP-A-2008-116389 discloses detection of fluorescence emitted from leakage oil in a case in which a measured object is irradiated with ultraviolet light, which includes the absorption wavelength of the leakage oil, from the outside, and an increase in detection accuracy for fluorescence using a filter which does not allow visible light components of an ultraviolet light source (black light) to pass therethrough and a band-pass filter which allows a central wavelength of fluorescence to pass therethrough.

However, in the technology disclosed in JP-A-2008-116389, the band-pass filter is used, with the result that the intensity of fluorescence which reaches a detector is reduced, and thus it is difficult to detect a small amount of leakage oil which is attached to, for example, the surface of a transformer. In addition, if an optical filter is used, there is a problem in that the structure of the detector is complicated.

SUMMARY OF THE INVENTION

An advantage of some aspects of the invention is to provide a leakage oil detection system which is capable of detecting leakage oil with high accuracy without complicating an apparatus.

According to an aspect of the present invention, there is provided a leakage oil detection system including: a measurement device that includes a light source that causes a measured object which includes a leakage oil attachment part to be irradiated with ultraviolet rays, and an imaging device that detects fluorescence emitted from the leakage oil attachment part which is irradiated with the ultraviolet rays, and performs imaging on the measured object; and an analysis device that includes a driving control unit that controls operations of the light source and the imaging device, a recording unit that records an imaged image of the measured object which is imaged by the imaging device, and an image processing unit that calls the imaged image which is recorded in the recording unit and performs an image process. The imaging device controls exposure according to an exposure control value provided in the imaging device, and the analysis device calls the imaged image which is recorded in the recording unit for the image processing unit, calculates brightness values of respective pixels in the imaged image, determines a maximum brightness value which has the largest value among the brightness values of the respective pixels, compares the maximum brightness value with a reference brightness value which is determined in advance, acquires the exposure control value of the imaging device, in which the nearest brightness value that is smaller than the reference brightness value is acquired, images the measured object again by the imaging device using the acquired exposure control value, transmits the acquired image to the image processing unit, and detects leakage oil by performing the image process by the image processing unit.

According to the present invention, it is possible to provide a leakage oil detection system which is capable of detecting leakage oil with high accuracy without complicating an apparatus.

DETAILED DESCRIPTION OF THE INVENTION

Hereinafter, a leakage oil detection system according to the present invention will be described based on embodiments. However, the present invention is not limited to the embodiments below, and it is possible to add various improvements and modifications by those skilled in a range without changing the gist of the invention. Meanwhile, in each embodiment, the same reference symbols are attached to the same components.

First Embodiment

Figure 1:
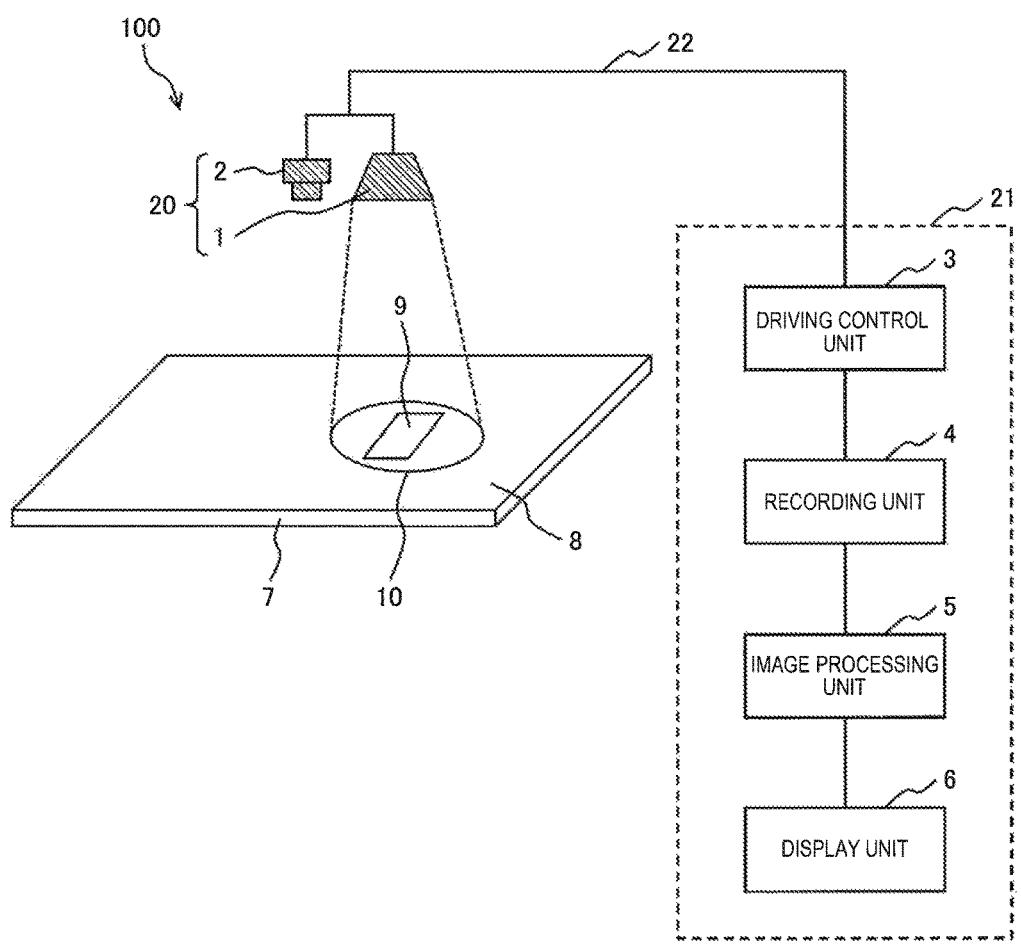
FIG. 1 is an outline configuration diagram illustrating a leakage oil detection system according to a first embodiment.

FIG. 1 is an outline configuration diagram illustrating a leakage oil detection system according to a first embodiment. As illustrated in the drawing, a leakage oil detection system 100 according to the embodiment includes a measurement device 20 and an analysis device 21. The measurement device 20 includes a light source (ultraviolet source) 1 that causes a measured object 7 to be irradiated with ultraviolet rays, and an imaging device 2 that images fluorescence emitted from the measured object 7 which is irradiated with the ultraviolet rays from the light source 1. In addition, the analysis device 21 includes a driving control unit 3 that controls the operations of the light source 1 and the imaging device 2 of the measurement device 20, a recording unit 4 that records an image of the measured object 7 which is imaged by the imaging device 2, an image processing unit 5 that calls an image of the measured object 7, which is recorded in the recording unit 4, and processes the image, and a display unit 6 that displays a result determined by the image processing unit 5. The leakage oil detection system 100 according to the present invention, basically, images the image of the measured object 7 by the measurement device 20 in a case in which the measured object 7 is irradiated with the ultraviolet rays, and detects (diagnoses) the attachment of leakage oil to the measured object 7 by performing an image process on the imaged image by the analysis device 21.

The measured object 7 is equipment in which there is a possibility of leakage oil, and, in particular, a transformer, a condenser, a hydraulic operator of a Gas Insulated Switch (GIS), a rectifier, and the like can be considered. In the present invention, the leakage oil of the measured object 7 is detected (a leakage oil attachment part 9 is specified) by the leakage oil detection system 100.

The measurement device 20 is installed in a location in which it is possible to cause the measured object 7 to be irradiated with the ultraviolet rays from the light source 1 and it is possible to detect and image the fluorescence emitted from the measured object 7 by the imaging device 2. The measurement device 20 is connected to the analysis device 21 through a cable 22, and is configured such that the image imaged by the imaging device 2 is transmitted to the analysis device 21. It is not necessary that the analysis device 21 is installed near the measured object. In addition, the measurement device 20 and the analysis device 21 may be connected to each other in either a wired manner or a wireless manner. In a case in which the measurement device 20 is connected to the analysis device 21 in the wireless manner, it is possible to remotely control the measurement device 20 by the analysis device 21.

Generally, if insulation oil is irradiated with the ultraviolet rays, the fluorescence is emitted. The ultraviolet rays emitted from the light source 1 (so-called black light) include visible light components which are 380 nm or more in addition to ultraviolet light components. Further, in the measurement environment of the measured object 7, visible light (external ambient light) is present. The visible light or visible light around the measured object 7 is reflected on the surface of the measured object 7, and the reflected light and the fluorescence emitted from the measured object 7 are imaged by the imaging device 2. In the present invention, the imaging device 2 is not particularly specified and it is possible to use a commercially available digital camera. In order to avoid influence of the external ambient light on leakage oil detection sensitivity, it is preferable that imaging is performed in a dark place. For example, it is preferable to perform imaging at an illumination of 10 lux or less.

In a case in which the measured object 7 is irradiated with the ultraviolet rays, the fluorescence emitted from the leakage oil attachment part 9 of the measured object 7 has stronger light intensity than the reflected light from a part 8 that leakage oil is not attached. However, if the imaging device 2 has, for example, a too-slow shutter speed, the entire image becomes white. In addition, if the imaging device 2 has a too-fast shutter speed, the entire image becomes black. In either case, it is difficult to distinguish the leakage oil attachment part 9 and the part 8 that the leakage oil is not attached. Here, in order to accurately detect the fluorescence emitted in a case in which the leakage oil is irradiated with ultraviolet rays, the exposure of the imaging device should be adjusted. If an exposure control value is appropriately adjusted, it is possible to increase leakage oil detection accuracy without depending on a measurement environment.

Meanwhile, as the exposure control value (a variable which determines exposure) of the imaging device 2, the shutter speed, the diaphragm value and the ISO value of the imaging device 2 can be considered. Hereinafter, in the specification, description is made for a case in which the shutter speed is considered as the exposure control value. However, instead of the shutter speed, the diaphragm value and the ISO value may be used as the exposure control value.

Figure 2:
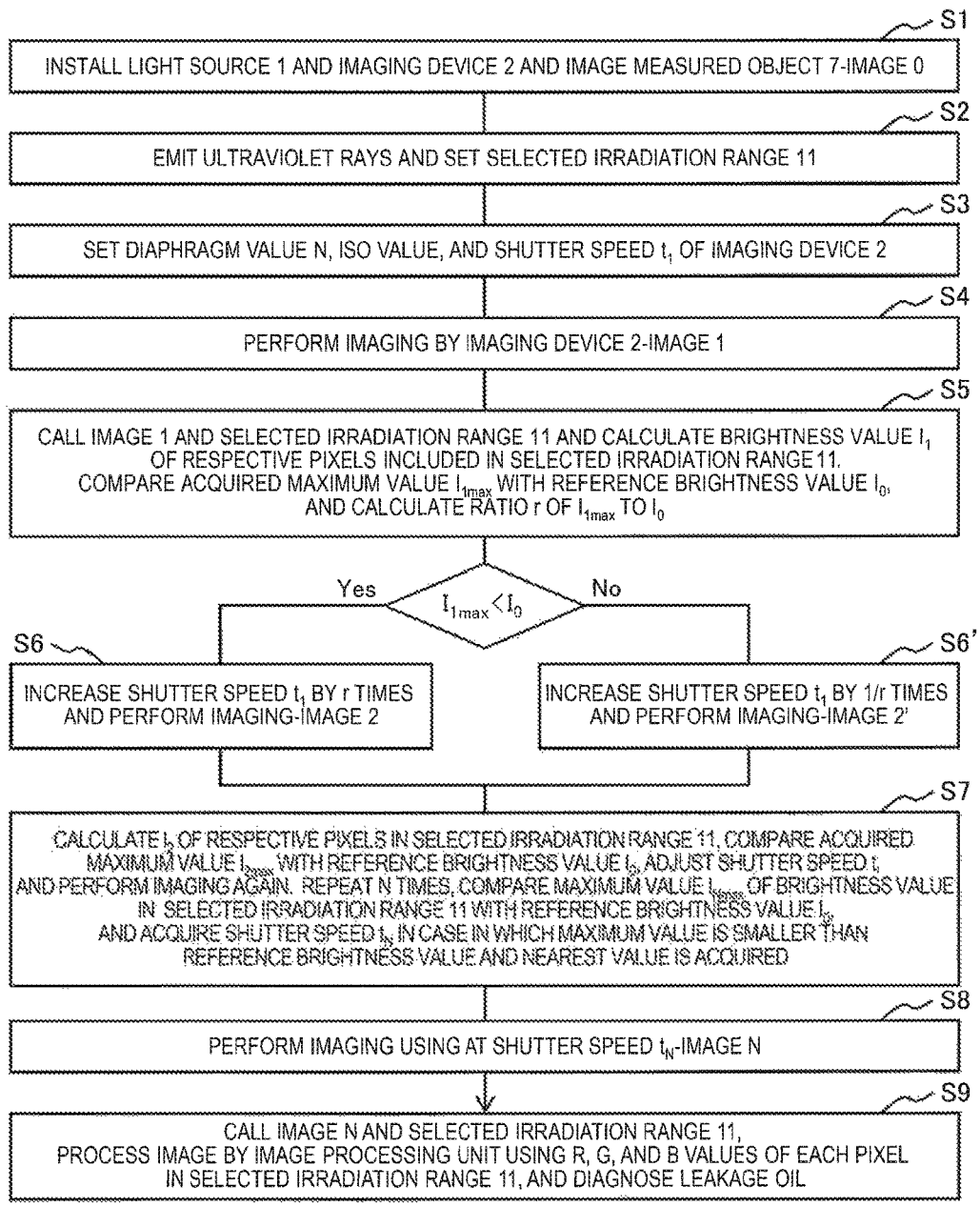
FIG. 2 is a flowchart illustrating a leakage oil detection method using the leakage oil detection system according to the first embodiment.

FIG. 2 is a flowchart illustrating a leakage oil detection method using the leakage oil detection system according to the first embodiment. Hereinafter, a process that is performed by the analysis device 21 of the leakage oil detection system 100 according to the present invention will be described. First, in STEP 1 (S1), the light source 1 is installed such that the detection target part of the measured object 7 (leakage oil attachment part 9) is irradiated with the ultraviolet rays. In addition, the imaging device 2 is installed such that the detection target part of the measured object 7 is imaged. At this time, an image 0 may be acquired and recorded in the recording unit 4 in such a way that a test for imaging the detection target part of the measured object 7 is performed. For example, in a case in which it is bright, imaging is performed using an automatic imaging mode (a mode for automatically adjusting the exposure control value). The acquired image is stored in the recording unit as the image 0.

Subsequently, in STEP 2 (S2), a selected irradiation range 11 is set in such a way that the measured object 7 is irradiated with the ultraviolet rays. Here, the selected irradiation range 11 is an area in which the intensity of the ultraviolet rays falls into a value of a certain range in an ultraviolet ray irradiation range 10.

Figure 3:
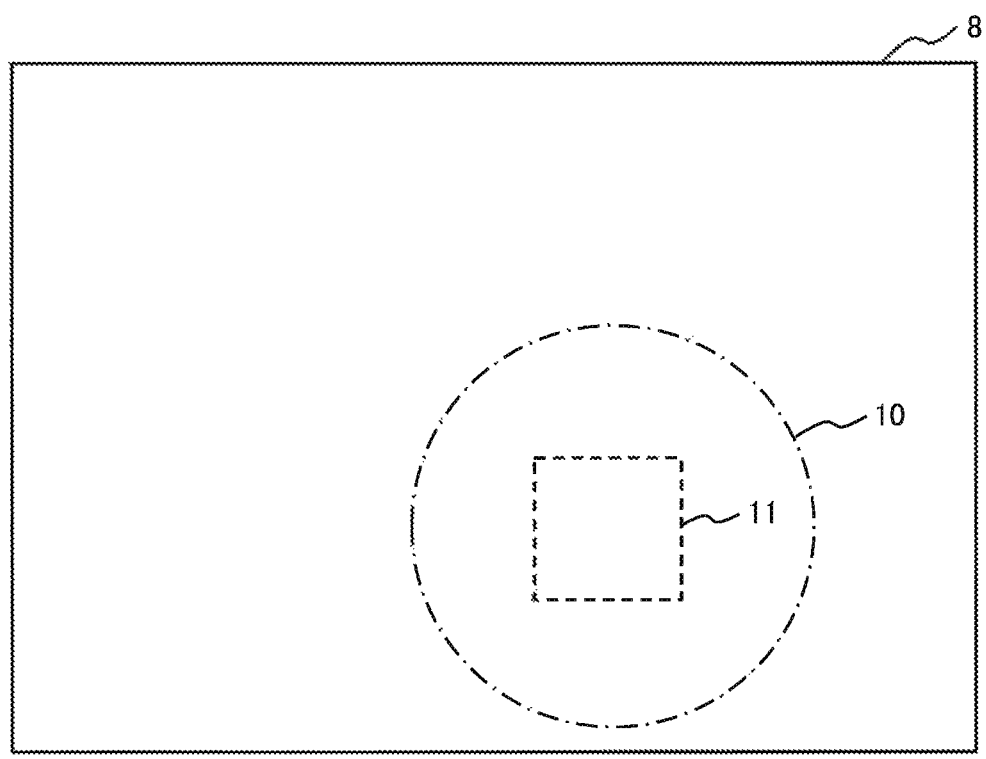
FIG. 3 is a schematic diagram illustrating an irradiation range and a selected irradiation range of a light source in the leakage oil detection system according to the first embodiment.

FIG. 3 is a schematic diagram illustrating an ultraviolet ray irradiation range and a selected irradiation range in the leakage oil detection system according to the first embodiment. Generally, the intensity of the ultraviolet rays emitted from the light source 1 is not uniform in the irradiation range 10. Therefore, in order to increase the leakage oil detection accuracy, a selected irradiation range 11, in which the irradiation intensity is almost uniform, is determined and stored in the recording unit 4, as illustrated in FIG. 3. Data in the selected irradiation range is used in a data process which will be described later. It is preferable that the selected irradiation range 11 is set to an area in which the intensity of the ultraviolet rays is included in 90 to 100% of the maximum intensity. The relationship between the sizes and shapes of the irradiation range 10 and the selected irradiation range 11 differs depending on the kind, the brand, and the like of the light source 1. If the selected irradiation range is set, it is possible to increase the detection accuracy.

The measured object 7 is irradiated with the ultraviolet rays, the imaged image is transmitted to the image processing unit 5 of the analysis device 21 based on the fluorescence detected by the imaging device, and a pixel group corresponding to the range (a range corresponding to 90 to 100% of the maximum intensity), in which it is possible to perform irradiation on an image with uniform intensity, is set as the selected irradiation range 11 and is recorded in the recording unit 4.

In STEP 3 (S3), a diaphragm value N of the imaging device 2 is set to $N_1$, an ISO value X is set to $X_1$, and a shutter speed t is set to $t_1$. It is assumed that $N_1$ and $X_1$ are fixed in the following process and only $t_1$ is changed.

In STEP 4 (S4), the measured object 7 is irradiated with the ultraviolet rays by the light source 1, and fluorescence emitted from the measured object 7 is detected and imaged by the imaging device 2. The acquired image is recorded in the recording unit 4 as an image 1.

In STEP 5 (S55), the image 1, which is recorded in the recording unit 4, and the selected irradiation range 11 are called in the image processing unit 5, and the brightness values $I_1$ of the respective pixels included in the selected irradiation range 11 are calculated. The maximum brightness value (maximum value $I_{1max}$) from among the respective pixels is acquired and compared with a reference brightness value $I_0$, thereby calculating a ratio r of $I_{1max}$ to $I_0$. Here, the reference brightness value $I_0$ is a maximum detection value (brightness value $I_0$) in a case in which the imaging device 2 does not perform overexposure, and is a brightness value acquired in a case in which the difference between a brightness value $I_9$ of the leakage oil attachment part 9 and a brightness value $I_8$ of the part 8, to which the leakage oil is not attached, becomes the largest.

It is preferable that the reference brightness value $I_0$ is calculated in advance before the leakage oil detection is performed, and is recorded in the recording unit 4. As a calculation method, for example, states, which are acquired before and after oil is attached to the surface of the measured object 7 under an environment of 10 lux or less, are respectively imaged several times at various shutter speed t, and the brightness value of the leakage oil attachment part is calculated in a case in which the difference in the brightness values between the leakage oil attachment part and a part to which the leakage oil is not attached becomes the largest from the acquired image. Meanwhile, the method of calculating the reference brightness value $I_0$ is not particularly limited if it is possible to acquire the maximum detection value in the case in which the imaging device 2 does not perform overexposure, and thus calculation can be performed using an arbitrary method.

As a method of calculating the brightness values of the respective pixels in the image, brightness (I) is calculated by extracting Red (R), Green (G), and Blue (B) of each of the pixels which are shown in the selected irradiation range 11 imaged by the imaging device 2. As a calculation formula of the brightness (I), for example, the following formula which is generally known is provided. The brightness value (I) of each of the pixels is calculated by the image processing unit 5 using the values of Red (R), Green (G), and Blue (B) of each of the pixels in the selected irradiation range 11 in the image imaged by the imaging device 2.

$$\text{Brightness}(I) = \frac{1}{3}R + \frac{1}{3}G + \frac{1}{3}B$$

Meanwhile, in addition to the above formula, the brightness (I) may be defined using R, G, and B with a formula which is generally known.

In STEP 6 (S6), in a case in which $I_{1max}<I_0$, setting is performed such that the shutter speed t becomes r times slower. That is, the shutter speed is set to $t_2$ ($t_2=t_1 \times r$) which is acquired by increasing $t_1$ by r times. Generally, since a unique shutter speed is set in the imaging device 2, there is a case in which it is difficult to adjust the shutter speed to completely the same shutter speed as the shutter speed acquired by increasing $t_1$ by r times. At this time, imaging is performed again at a shutter speed $t_{2a}$ which is the nearest to $t_1 \times r$. The acquired image is recorded in the recording unit 4 as an image 2.

In contrast, in STEP 6' (S6'), in a case of $I_{1max}>I_0$, setting is performed such that the shutter speed t becomes r times faster. That is, the shutter speed $t_2'$ ($t_2'=t_1 \times 1/r$), which is acquired by increasing $t_1$ by 1/r times, is acquired. As in the case of S6, since a unique shutter speed is generally set in the imaging device 2, it is difficult to adjust the shutter speed to completely the same shutter speed as the shutter speed acquired by increasing $t_1$ by 1/r times, and thus imaging is performed again at a shutter speed $t_{2a}'$ which is the nearest to $t_1 \times 1/r$. The acquired image is recorded in the recording unit 4 as an image 2'.

In STEP 7 (S7), as in the case of S5, the image 2 or the image 2' and the selected irradiation range 11 are called, and brightness value $I_2$ of each of the pixels of the image 2 or the image 2' in the selected irradiation range 11 is calculated. The acquired maximum value $I_{2max}$ is compared with the reference brightness value $I_0$. In a case of $I_{2max}<I_0$, imaging is performed at a shutter speed $t_3$, which is acquired by increasing the shutter speed $t_2$ by r times, or at a unique shutter speed $t_{3a}$, which is the nearest to $t_3$, of the imaging device 2. In addition, in a case of $I_{2max}>I_0$, imaging is performed at a shutter speed $t_3'$, which is acquired by increasing the shutter speed $t_2'$ by 1/r times, or at a unique shutter speed $t_{3a}'$, which is the nearest to $t_3'$, of the imaging device 2.

As described above, if STEP 7 (S7) is repeated N times, in the selected irradiation range 11, the maximum value $I_{Nmax}$ of the brightness value of each of the pixels, which is smaller than $I_0$ or which is the nearest to $I_0$ is acquired. It is assumed that a shutter speed in a case in which the $I_{Nmax}$ is acquired is $t_N$.

In STEP 8 (S8), imaging is performed at the shutter speed $t_N$. The acquired image is recorded in the recording unit 4 as an image N.

In STEP 9 (S9), the image N and the selected irradiation range 11 are called, and the image is processed by the image processing unit 5 using the R, G, and B values of each of the pixels in the selected irradiation range 11, thereby diagnosing leakage oil. Here, the leakage oil diagnosis method is not particularly limited. The R, G, and B values are determined in advance in a case in which there is leakage oil, and thus it is possible to diagnose whether or not there is leakage oil by comparing the R, G, and B values of the image N with the R, G, and B values which are determined in advance.

Meanwhile, in the embodiment, part of the pixels included in the selected irradiation range 11, for example, pixels corresponding to X % are extracted using the external ambient light irradiation direction, the maximum value $I_{1max-1}$ of the brightness values of the pixels is compared with the reference brightness value $I_0$, and thus it is possible to set a shutter speed for imaging an image for the image process.

Furthermore, it is possible to acquire the same effect in a case in which the flow of FIG. 2 is performed using the diaphragm value N or the ISO value in addition to the adjustment of the shutter speed t as described above.

As described above, according to the configuration of the embodiment, it is possible to provide a leakage oil detection system which is capable of detecting leakage oil with high accuracy without complicating an apparatus.

Second Embodiment

Figure 4:
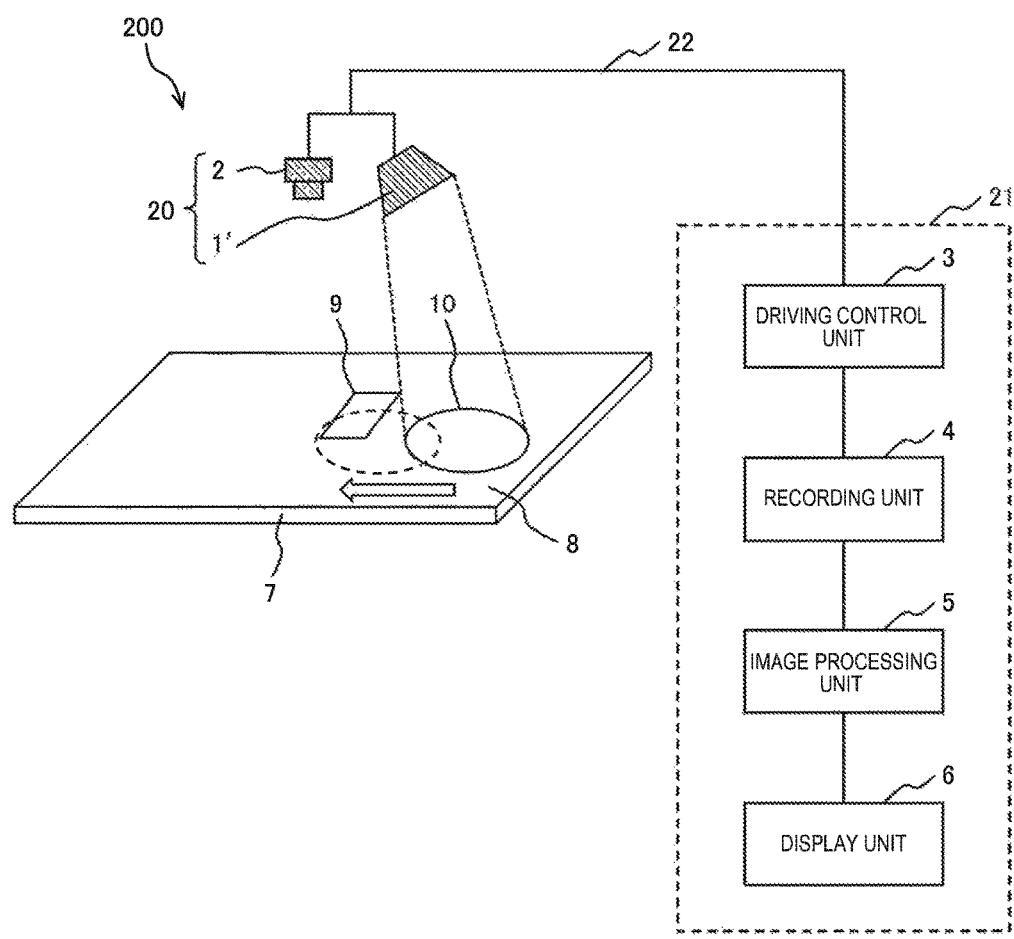
FIG. 4 is an outline configuration diagram illustrating a leakage oil detection system according to a second embodiment.

FIG. 4 is an outline configuration diagram illustrating a leakage oil detection system according to a second embodiment. A leakage oil detection system 200 according to the embodiment includes a light source 1' that has a swing function, and is capable of performing leakage oil detection in a wide range without moving the light source by adjusting a swing angle under the control of the driving control unit 3. For example, even though the measured object 7 has a large area like one surface of an oil filled apparatus, such as a transformer, it is possible to cause the ultraviolet rays to be emitted without moving the light source. Meanwhile, in the embodiment, the same reference symbols are attached to the same components as in the first embodiment and the description thereof will not be repeated, and only different parts will be described. In addition, since the imaging device 2, the driving control unit 3, the recording unit 4, the image processing unit 5 and the display unit 6 are the same as in the first embodiment illustrated in FIG. 1, the description thereof will not be repeated.

Figure 5:
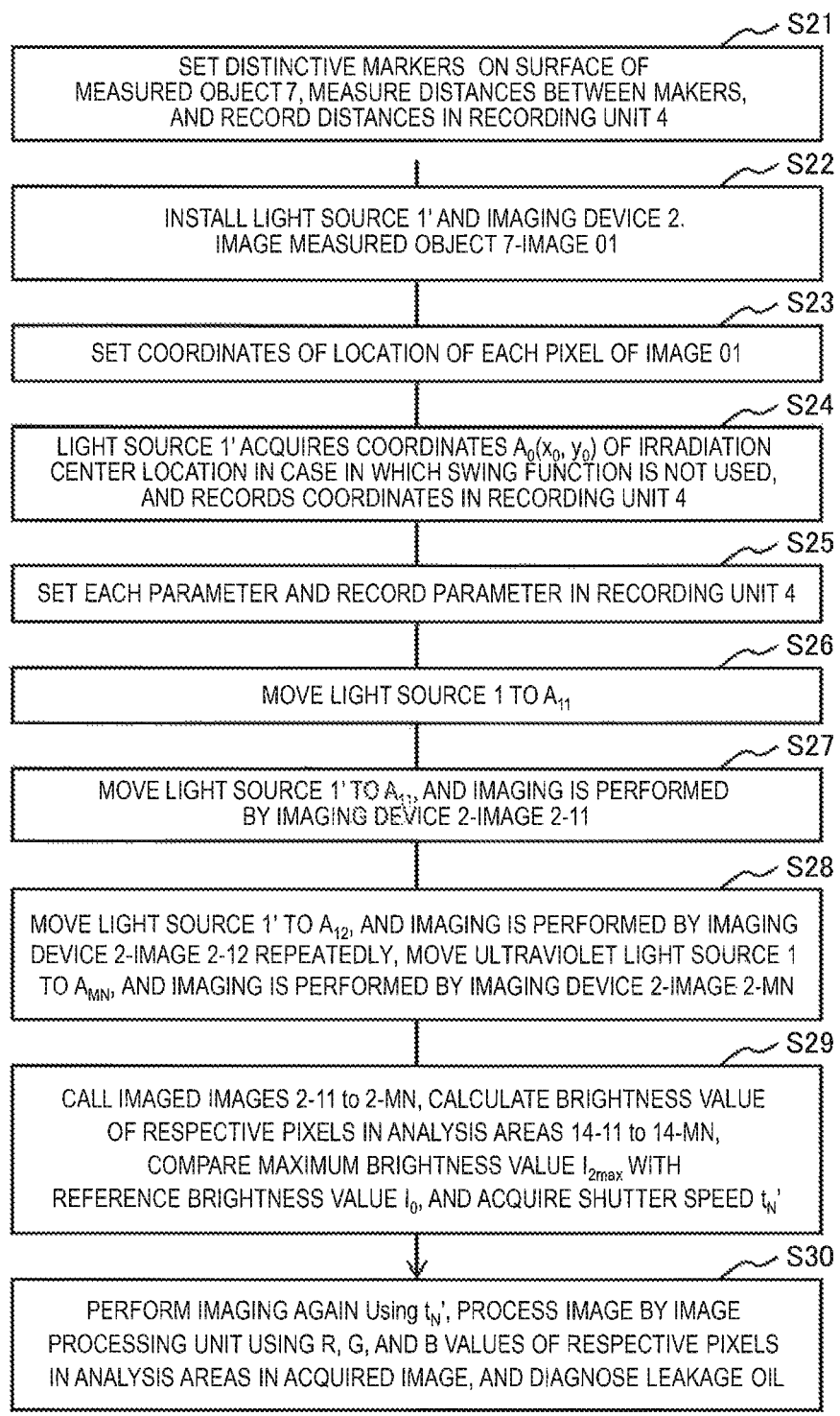
FIG. 5 is a flowchart illustrating a leakage oil detection method using the leakage oil detection system according to the second embodiment.

FIG. 5 is a flowchart illustrating a leakage oil detection method using the leakage oil detection system according to the second embodiment. Hereinafter, a process performed by the analysis unit of the leakage oil detection system 200 according to the present invention will be described.

In STEP 21 (S21), at least two markers or distinctive spots (hereinafter, referred to as markers or the like) are set to the surface of the measured object 7, and distances between the markers or the like are measured and recorded in the recording unit 4.

In STEP 22 (S22), the location of the light source 1' is adjusted such that the detection target part of the measured object 7 (leakage oil attachment part 9) enters an irradiation range using the swing function of the light source 1'. In addition, the imaging device 2 is installed such that the detection target part of the measured object 7 is imaged. At this time, a test for imaging the detection target part of the measured object 7 is performed, and an image 01 is acquired and recorded in the recording unit 4. For example, in a case in which it is bright, imaging is performed using the automatic imaging mode. The acquired image is recorded in the recording unit 4 as the image 01.

In STEP 23 (S23), the location of each of the pixels of the image 01 is set using coordinates. A setting method is not particularly limited. For example, the lower left end pixel of the image is set to the origin (0, 0) of coordinates, a right direction is set to an x coordinate, and an upper direction is set to a y coordinate. Comparison with the distances acquired in STEP 21 is performed using the set coordinates of the markers or the like, a magnification of the distances between the two markers or the like in the image acquired from the coordinates and distances of a real object are acquired, coordinates corresponding to the respective markers or the like on the surface of the measured object 7 are acquired, and the results thereof are recorded in the recording unit 4. In order to simply set the coordinates corresponding to the respective markers or the like on the surface of the measured object 7, it is preferable to perform installment such that the arrangement direction of the detector of the imaging device 2 is parallel to the surface of the measured object.

Meanwhile, a method of acquiring the coordinates of the markers or the like is not particularly limited and any method may be used if the coordinates of each of the pixels in the image and the coordinates of the markers or the like may be acquired.

In STEP 24 (S24), in the image 01, the light source 1' acquires the coordinates $A_0(x_0, y_0)$ of an irradiation center location in an initial state, that is, in a case in which the swing function is not used, and records the coordinates in the recording unit 4.

If an arbitrary point (x, y) in the image is selected through the setting performed in STEP 23 and STEP 24 and is transmitted to the driving control unit 3, it is possible to move the irradiation center of the light source 1' to (x, y).

Figure 6:
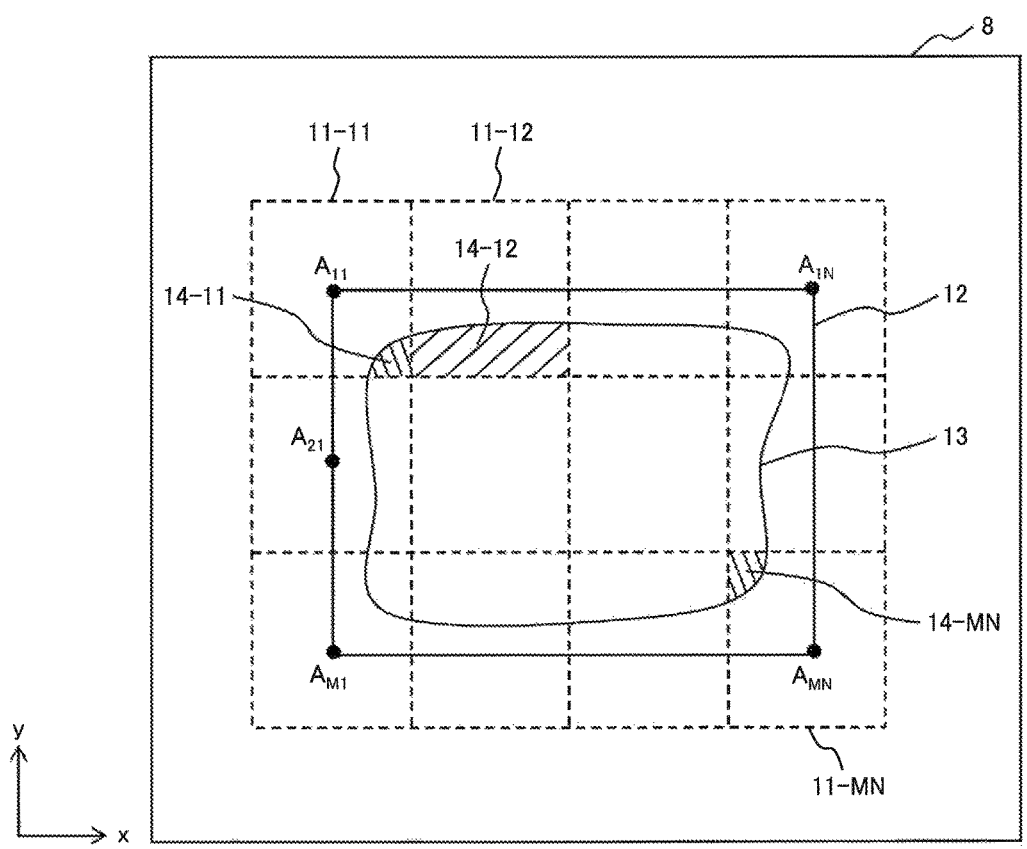
FIG. 6 is a schematic diagram illustrating an image process according to the second embodiment.

FIG. 6 is a schematic diagram illustrating an image process according to the second embodiment. In STEP 25 (S25), each following parameter is set and recorded in the recording unit 4, as illustrated in FIG. 6. The coordinates $A_{11}(x_1, y_1)$ and $A_{MN}(x_M, y_N)$ of the irradiation center of the light source 1' are set. A rectangular irradiation center range 12, which has a straight line $A_{11}A_{MN}$ as a diagonal line, is automatically set. Since it is possible for the light source 1' to be moved horizontally (the x direction of FIG. 6) or vertically (the y direction of FIG. 6) with regard to the surface of the measured object 7, N steps in the horizontal direction and M steps in the vertical direction are set from $A_{11}$ to $A_{MN}$. If setting is performed as above, the selected irradiation ranges 11-11, 11-12, . . . , 11-MN of the ultraviolet source 1' are automatically set. Here, it is preferable that the selected irradiation range is an area in which it is possible to emit the ultraviolet rays with uniform intensity as the same as the selected irradiation range 11 described in the first embodiment. Here, a leakage oil diagnosis area 13 is set. It is possible to freely set the shape of the leakage oil diagnosis area 13 according to the shape of the surface of the measured object 7. The size of the leakage oil diagnosis area 13 is smaller than the size of the irradiation center range 12 such that the whole leakage oil diagnosis area 13 is irradiated.

In the selected irradiation range, areas which overlap with the leakage oil diagnosis area 13 are set as analysis areas 14-11, 14-12, . . . , 14-MN and recorded in the recording unit 4.

In a case in which each of the irradiation centers are irradiated, the light source 1' sets stationary time T. In addition, it is preferable to set appropriate mitigation time T' until the vibration of the light source 1' stops after the light source 1' has moved. That is, the imaging device 2 performs imaging after the time T' elapses since the light source 1' moves to a designated irradiation center.

In the embodiment, a diaphragm value N of the imaging device 2 is set to $N_{21}'$, and an ISO value $X_{21}'$ and an appropriate shutter speed $t_{21}'$ are set.

In STEP 26 (S26), the irradiation center of the light source 1' moves from an irradiation center $A_0$ to an irradiation center $A_{11}$. Thereafter, if the irradiation center of the light source 1' moves from $A_{11}$ to $A_{1N}$ and ultraviolet ray irradiation and imaging of the selected irradiation range corresponding to one row are finished, the irradiation center is moved to $A_{21}$. In addition, the irradiation center is moved from $A_{21}$ to $A_{2N}$ in the same manner. The above steps are repeated, and thus ultraviolet ray irradiation and imaging are performed by moving the irradiation center to $A_{MN}$.

In STEP 27 (S27), the irradiation center of the light source 1' is moved to $A_{11}$, and imaging is performed at the shutter speed $t_{21}'$, which is set by the imaging device 2, after the time T' has elapsed since the ultraviolet rays are emitted. An acquired image is recorded in the recording unit 4 as an image 2-11. It is preferable that setting is performed such that time $T'+t_{21}'$ is shorter than the time T.

In STEP 28 (S28), after the time T has elapsed, the irradiation center of the light source 1' is moved to $A_{12}$, an image is imaged as in STEP 27, and the acquired image is recorded in the recording unit 4 as an image 2-12.

As described above, the irradiation center of the light source 1' is moved to $A_{MN}$, and imaging is performed. All of the acquired images are recorded in the recording unit 4.

In STEP 29 (S29), the imaged image 2-11 is called and the brightness value $I_{2\text{-}11}$ of each of the pixels in an analysis area 14-11 is calculated. Subsequently, the imaged image 2-12 is called and the brightness value $I_{2\text{-}12}$ of each of the pixels in an analysis area 14-12 is calculated.

As described above, all the brightness values of the respective pixels in the analysis areas from 14-11 to 14-MN are calculated, and the maximum value $I_{2max}$ is compared with the reference brightness value $I_0$. As in the first embodiment, a shutter speed $t_N'$ is acquired in a case in which $I_{2max}$ is smaller than $I_0$ and the nearest value is acquired. A reference brightness value calculation method is the same as in the first embodiment.

In STEP 30 (S30), imaging is performed again using $t_N'$, the image is processed by the image processing unit 5 using the R, G, and B values of each of the pixels in the analysis areas from 14-11 to 14-MN in the acquired image, and the existence/non-existence of leakage oil is diagnosed.

According to the embodiment, it is possible to perform leakage oil detection with high detection accuracy in a wide range, for example, one surface of a transformer.

As described above, according to the present invention, it is possible to provide a leakage oil detection system which is capable of detecting leakage oil with high accuracy without complicating an apparatus.

Meanwhile, the present invention is not limited to the embodiment and includes various modified examples. The embodiment is described to easily understand the present invention, and is not necessarily limited to all the described configurations. In addition, it is possible to replace part of the configuration of a certain embodiment with the configuration of another embodiment and it is possible to add the configuration of another embodiment to a certain embodiment. In addition, it is possible to add, remove, and replace another configuration to, from and with part of the configuration of each embodiment.

What is claimed is:

1. A leakage oil detection system comprising:
   a light source that causes a measured object which includes a leakage oil attachment part to be irradiated with ultraviolet rays;
   an imaging device that detects fluorescence emitted from the leakage oil attachment part which is irradiated with the ultraviolet rays, and performs imaging on the measured object; and
   an analysis device including a driving control unit that controls operations of the light source and the imaging device, a recording unit that records an imaged image of the measured object which is imaged by the imaging device, and an image processing unit that calls the imaged image which is recorded in the recording unit and performs an image process,
   wherein the imaging device controls exposure according to an exposure control value provided in the imaging device,
   wherein the analysis device calls the imaged image which is recorded in the recording unit for the image processing unit, calculates brightness values of respective pixels in the imaged image, determines a maximum brightness value which has the largest value among the brightness values of the respective pixels, compares the maximum brightness value with a reference brightness value which is determined in advance, acquires the exposure control value of the imaging device, in which the nearest brightness value that is smaller than the reference brightness value is acquired, images the measured object again by the imaging device using the acquired exposure control value, transmits the acquired image to the image processing unit, and detects leakage oil by performing the image process by the image processing unit, and
   wherein the reference brightness value is the brightness value of the leakage oil attachment part in a case in which a difference in the brightness values of the leakage oil attachment part and a part to which the leakage oil is not attached becomes the largest from an image which is imaged and acquired by putting oil on a surface of the measured object so as to change the exposure control value under an environment of 10 lux or less.

2. A leakage oil detection system comprising:
   a light source that causes a measured object which includes a leakage oil attachment part to be irradiated with ultraviolet rays;
   an imaging device that detects fluorescence emitted from the leakage oil attachment part which is irradiated with the ultraviolet rays, and performs imaging on the measured object; and
   an analysis device including a driving control unit that controls operations of the light source and the imaging device, a recording unit that records an imaged image of the measured object which is imaged by the imaging device, and an image processing unit that calls the imaged image which is recorded in the recording unit and performs an image process,
   wherein the imaging device controls exposure according to an exposure control value provided in the imaging device,
   wherein the analysis device calls the imaged image which is recorded in the recording unit for the image processing unit, calculates brightness values of respective pixels in the imaged image, determines a maximum brightness value which has the largest value among the brightness values of the respective pixels, compares the maximum brightness value with a reference brightness value which is determined in advance, acquires the exposure control value of the imaging device, in which the nearest brightness value that is smaller than the reference brightness value is acquired, images the measured object again by the imaging device using the acquired exposure control value, transmits the acquired image to the image processing unit, and detects leakage oil by performing the image process by the image processing unit, and
   wherein the analysis device selects a selected irradiation range, in which an irradiation intensity of the ultraviolet rays becomes a value in a specified range, in an ultraviolet ray irradiation range, and sets the maximum value of the brightness of the respective pixels in the selected irradiation range in the imaged image as the maximum brightness value.

3. The leakage oil detection system according to claim 2, wherein the irradiation intensity of the ultraviolet rays in the selected irradiation range is 90 to 100% of a maximum irradiation intensity of the light source.

4. A leakage oil detection system comprising:
   a light source that causes a measured object which includes a leakage oil attachment part to be irradiated with ultraviolet rays;

an imaging device that detects fluorescence emitted from the leakage oil attachment part which is irradiated with the ultraviolet rays, and performs imaging on the measured object; and an analysis device including a driving control unit that controls operations of the light source and the imaging device, a recording unit that records an imaged image of the measured object which is imaged by the imaging device, and an image processing unit that calls the imaged image which is recorded in the recording unit and performs an image process, wherein the imaging device controls exposure according to an exposure control value provided in the imaging device, wherein the analysis device calls the imaged image which is recorded in the recording unit for the image processing unit, calculates brightness values of respective pixels in the imaged image, determines a maximum brightness value which has the largest value among the brightness values of the respective pixels, compares the maximum brightness value with a reference brightness value which is determined in advance, acquires the exposure control value of the imaging device, in which the nearest brightness value that is smaller than the reference brightness value is acquired, images the measured object again by the imaging device using the acquired exposure control value, transmits the acquired image to the image processing unit, and detects leakage oil by performing the image process by the image processing unit, and wherein the analysis device acquires a ratio r of the maximum brightness value to the reference brightness value, and, in a case in which the maximum brightness value is smaller than the reference brightness value, images the measured object again by selecting the exposure control value which is the nearest to a value acquired by increasing the exposure control value by r times.

5. A leakage oil detection system comprising:

a light source that causes a measured object which includes a leakage oil attachment part to be irradiated with ultraviolet rays;

an imaging device that detects fluorescence emitted from the leakage oil attachment part which is irradiated with the ultraviolet rays, and performs imaging on the measured object; and an analysis device including a driving control unit that controls operations of the light source and the imaging device, a recording unit that records an imaged image of the measured object which is imaged by the imaging device, and an image processing unit that calls the imaged image which is recorded in the recording unit and performs an image process, wherein the imaging device controls exposure according to an exposure control value provided in the imaging device, wherein the analysis device calls the imaged image which is recorded in the recording unit for the image processing unit, calculates brightness values of respective pixels in the imaged image, determines a maximum brightness value which has the largest value among the brightness values of the respective pixels, compares the maximum brightness value with a reference brightness value which is determined in advance, acquires the exposure control value of the imaging device, in which the nearest brightness value that is smaller than the reference brightness value is acquired, images the measured object again by the imaging device using the acquired exposure control value, transmits the acquired image to the image processing unit, and detects leakage oil by performing the image process by the image processing unit, and wherein the analysis device acquires a ratio r of the maximum brightness value to the reference brightness value, and, in a case in which the maximum brightness value is larger than the reference brightness value, images the measured object again by selecting the exposure control value which is nearest to a value acquired by increasing the exposure control value by 1/r times.

6. A leakage oil detection system comprising:

a light source that causes a measured object which includes a leakage oil attachment part to be irradiated with ultraviolet rays;

an imaging device that detects fluorescence emitted from the leakage oil attachment part which is irradiated with the ultraviolet rays, and performs imaging on the measured object; and an analysis device including a driving control unit that controls operations of the light source and the imaging device, a recording unit that records an imaged image of the measured object which is imaged by the imaging device, and an image processing unit that calls the imaged image which is recorded in the recording unit and performs an image process, wherein the imaging device controls exposure according to an exposure control value provided in the imaging device, wherein the analysis device calls the imaged image which is recorded in the recording unit for the image processing unit, calculates brightness values of respective pixels in the imaged image, determines a maximum brightness value which has the largest value among the brightness values of the respective pixels, compares the maximum brightness value with a reference brightness value which is determined in advance, acquires the exposure control value of the imaging device, in which the nearest brightness value that is smaller than the reference brightness value is acquired, images the measured object again by the imaging device using the acquired exposure control value, transmits the acquired image to the image processing unit, and detects leakage oil by performing the image process by the image processing unit, wherein the light source has a swing function, and is capable of causing a wide range of a surface of the measured object to be irradiated with the ultraviolet rays, and wherein the analysis device divides the imaged image, which is called in the image processing unit, into a plurality of selected irradiation ranges, sets coordinates of an irradiation center, which is a center of the irradiation range of the ultraviolet rays, in each of the plurality of selected irradiation ranges, and controls the driving control unit such that the center of the irradiation range of the ultraviolet rays moves to the irradiation center using the swing function of the light source.

7. The leakage oil detection system according to claim 6, wherein the irradiation intensity of the ultraviolet rays, which cause at least one of the selected irradiation ranges to be irradiated, is 90 to 100% of a maximum irradiation intensity of the light source.

8. The leakage oil detection system according to claim 2, wherein the analysis device sets a part, at which the selected irradiation range overlaps the leakage oil attachment part, as an analysis area, and diagnoses existence or non-existence of the leakage oil by performing the image process by the image processing unit using R, G, and B values of each of the pixels in the analysis area.

\* \* \* \* \*